United States Patent [19]

Apffel

[11] Patent Number: 5,057,189
[45] Date of Patent: Oct. 15, 1991

[54] RECOVERY APPARATUS

[76] Inventor: Fred Apffel, P.O. Box 691386, Houston, Tex. 77269-1386

[21] Appl. No.: 365,279

[22] Filed: Jun. 12, 1989

Related U.S. Application Data

[60] Continuation-in-part of Ser. No. 742,724, Jun. 7, 1985, Pat. No. 4,647,443, which is a division of Ser. No. 19,638, Feb. 27, 1987, Pat. No. 4,839,151, and a continuation-in-part of Ser. No. 660,420, Oct. 12, 1984, abandoned.

[51] Int. Cl.$^5$ .......................... C10B 7/10; C10B 23/00
[52] U.S. Cl. ..................................... 202/113; 202/117; 202/118; 422/150
[58] Field of Search ............... 422/150, 152, 153, 154, 422/155; 423/449, 450, 455–457; 219/10.57; 201/2.5; 202/117, 118, 113, 226

[56] References Cited

U.S. PATENT DOCUMENTS

| | | | |
|---|---|---|---|
| 3,843,457 | 10/1974 | Grannen et al. | 201/2.5 |
| 3,997,407 | 12/1976 | Fujii et al. | 201/2.5 X |
| 4,029,550 | 6/1977 | Mitsui et al. | 201/25 X |
| 4,030,984 | 6/1977 | Chambers | 201/2.5 X |
| 4,123,332 | 10/1978 | Rotter | 201/15 |
| 4,203,804 | 5/1980 | Janning et al. | 201/2.5 X |
| 4,250,158 | 2/1981 | Solbakken et al. | 201/2.5 X |
| 4,284,616 | 8/1981 | Solbakken et al. | 201/2.5 X |
| 4,300,915 | 11/1981 | Schmidt et al. | 201/2.5 X |

Primary Examiner—Peter Kratz
Attorney, Agent, or Firm—David M. Ostfeld

[57] ABSTRACT

An apparatus for economically recovering char, oil and fuel gas from vehicle tires is disclosed, for either whole tires or physically fragmented tires. The tires may be washed to remove dirt and road film. The tires are dried and preheated with super-heat steam. The hot tires are pyrolyzed to partially devolatize a major portion of the hydrocarbons and produce a char that can be separated from the steel and fiber glass. The char may be subsequently pyrolyzed with microwaves that elevate the tire temperature and devolatize the remaining hydrocarbons from the char as gas. The hot gases are cooled and partially condensed. The uncondensed gas is used as fuel. The condensed oil is sent to storage. The solid residue from the tire pyrolysis is substantially char, fiberglass and steel. The char is mechanically separated from the glass and steel. Alternately, the char and the glass and steel are separated by dumping the hot mixture into a water quench tank. The mixture is cooled. The char floats to the water surface and is removed. The glass and steel sink to the bottom of the tank and are removed separately. The char may be sold or burned or milled to break down agglomerates and subsequently pelletized and bagged. The steel and glass are discarded as trash.

5 Claims, 6 Drawing Sheets

RECOVERY APPARATUS

CROSS REFERENCE TO RELATED APPLICATIONS

This application is a continuation-in-part of U.S. application Ser. No. 742,724, filed June 7, 1985, now U.S. Pat. No. 4,647,443, entitled "Recovery Process", which is a continuation-in-part of U.S. application Ser. No. 660,420, filed Oct. 12, 1984, now abandoned, by Fred Apffel, entitled "RECOVERY PROCESS". This is a division of Ser. No. 019638 filed Feb. 27, 1987, now U.S. Pat. No. 4,839,151.

FIELD OF THE INVENTION

The invention relates generally to processes for economically recovering carbonaceous materials from used vulcanized articles. More specifically it relates to an economical pyrolysis process for recovering carbon black, oil, fuel gas, steel and char or carbon black from used tires.

BACKGROUND OF THE PRIOR ART

Passenger cars and trucks on U.S. highways wear out tens of millions of tires each year. Disposal of these used tires has become a major environmental problem. A high proportion (up to 30–40%) of the weight of a used tire consists of carbon black reinforcing of the rubber in both the tread and sidewalls. This carbon black is prepared by conventional carbon black production processes and comprises individual particles one micron or less in diameter. Fifty to sixty percent (50–60%) of the weight of a discarded tire is butadiene-styrene copolymer rubber. Tires also contain large amounts of oil and significant quantities of steel, wire and/or fiberglass or polyester cord. All of these components are expensive and require large amounts of energy in their manufacture. A process that would allow economic recovery of these materials from the huge stocks of used tires piling up around the country would be very desirable. Unfortunately, the very characteristics that make tires long-lasting and safe of the road, i.e., durability, resistance to puncture and slicing, and resistance to decomposition at moderate temperature, combine to make tires exceptionally difficult to recycle.

The prior art teaches that rubber can be pyrolyzed in the absence of air at temperatures of between 842° and 1112° Fahrenheit in laboratory equipment to produce oil, gas and solid residue that is carbonaceous in nature. Large electrically heated sink reactors and Dewar flasks have been used for obtaining test data.

The prior art also teaches some pilot plants that were built to carry tire processing schemes into the commercial world. Circulating heated ceramic balls have been used a direct source of reaction heat. The balls are heated externally, mixed with rubber feed chips, discharged, screened, reheated and recycled. These reactions take place substantially at atmospheric pressure. Other pilot plants have been designed which make the carbonaceous solid phase of tire pyrolysis into fuel briquets. These fuel briquets are much less valuable than the carbon black produced by the present invention. Still other batch pilot plants have been built in which the tires are indirectly heated through the tray walls of multi-tray reactors to temperatures of between 1400° and 1600° Fahrenheit. At these temperatures, heavy oils and tar products can be recycled for further cracking to improve carbon black yields. Other batch and continuous type process plants have been built that depend on indirect heating through walls of a jacketed screw reactor from a high temperature molten salt heat sink. Other continuous type process plants have been built that depend on indirect heating through hollow shaft and hollow flight screw conveyors from a high temperature molten salt bath, which also use the carbon black for commercial purposes as carbon black.

In each of the prior plants set out above, the heat must be transferred indirectly from a heat source to a solid tire particle through a wall or directly through heated ceramic balls. Indirect heating as the sole means of heat transfer causes coating and other nonuniform heating problems.

It is an object of the present invention to overcome these problems, and heat the tires directly without direct physical intrusion into the process reactor.

An alternate objective of the present invention is to teach a method of and teach apparatus for pyrolyzing used tires economically into commercial quantities of char which can be used as a solid fuel in lieu of carbon black.

Also, in each of the prior art types of pyrolysis plants set out above, the tires were required to be physically broken apart into smaller pieces or fragments except those that show direct melting of held whole tires. Commercially available tire disintegrators include slicing machines, hammer mills, debeaders and manglers that have been adapted to tire reduction from other industries. The recent introduction of steel reinforcing in both passenger and truck tires has greatly increased the difficulty and expense of sufficiently disintegrating a tire to convert it into a useable pyrolysis feed stock It is another object of the present invention to overcome the physical difficulties of the prior art in preparing used tires as a feed stock by processing whole tires.

It is also believed that the prior art has never taught a satisfactory method of completely devolatizing the heavy oil and tars that coat the residue carbon black particles due to the limitations of indirect heating or contact direct heating.

It is a further object of the present invention to teach a method of direct heating that fully devolatizes the oil at the carbon black particle thus producing a carbon black with properties equal to that of the original carbon black.

It is yet another object of the present invention to teach a method and an apparatus for pyrolyzing used tires economically into commercial quantities of oil and fuel gas.

It is still a further object of this invention to teach a method of recovering steel scrap from used tires.

It is yet another object of the present invention to teach a method of pyrolyzing used tires that is energy efficient and generates fuel gas necessary to operate a large part of the process within environmental regulations from the process itself.

It is yet another object of the present invention to teach a method of and teach apparatus for pyrolyzing used tires economically into commercial quality and quantities of carbon black.

It is yet another alternate objective of the present invention to teach a method of and apparatus for cooling the hot char, steel and fiberglass while simultaneously providing a means of separating the char from the steel and fiberglass.

It is yet another alternate objective of the present invention to teach a method of and apparatus for reheating the cooled char with an indirect heat source such as hot oil. The heated char is subsequently pyrolyzed with microwave energy to produce carbon black.

BRIEF DESCRIPTION OF THE INVENTION

The invention is a process for economically pyrolyzing used tires into commercial quantities of carbon black, fuel oils and fuel gas. Alternately, the invention is a process for economically pyrolyzing used tires into char, fuel oil, gas and steel.

Whole tires are preferably prewashed to remove dirt and road film. Where it is preferred to produce char in lieu of carbon black, it is not necessary to wash the tires. The clean tires are conveyed to a steam preheating chamber where they are heated to a temperature level of 200° to 500° Fahrenheit. The steam heated tires are dumped through a three-stage gate system into a radient heated stainless steel or refractory lined steel pyrolysis chamber. Here the tires are conveyed along by a flatbed stainless steel conveyor. A multiple number of tubes heated to 1500°-2000° F. external to the tires chamber produce the radient heat that supply the energy to pyrolize the tires and partially devolatize the hydrocarbons as a gas.

The radient energy heats the tires to a temperature level of 800° to 1000° Fahrenheit. The temperatures are controlled at levels of 800° to 1000° Fahrenheit by measuring the pyrolysis gas exhaust gas temperature and increasing or decreasing the input of fuel oil or gas.

The volatile hydrocarbon gases exit the pyrolysis chamber through a cyclone separator where entrained dust is removed. The dust leaves the bottom of the cyclone through a rotary lock to recombine with char produced from the pyrolysis of the tires.

The dust-free gas is fed to a direct oil condensing spray chamber where the heavier oils are condensed to a temperature level of 400° to 350° Fahrenheit. The condensed heavy oil product is subsequently sent to storage. The uncondensed gases are then further cooled in a conventional water cooled exchanger to approximately 100° Fahrenheit and further condensation results. The mixture is then fed to a three-phase separator where the uncondensed gas, water and oil are separated. Then the condensed oil is sent to storage; the gas is compressed and used as plant fuel; and the water is processed through an oil water separator to remove the final traces of oil, which is stored, and the water is sewered.

The char from the pyrolysis chamber is dumped through a gate system into a rotary screen system where the char is separated from the steel and fiberglass. The steel and fiberglass are cooled, and the steel is separated from the fiberglass magnetically. If char is to be produced as a solid fuel, the char is cooled and sent to storage. If the char is to be refined to carbon black, it is processed through a rotary lock into a final char pyrolysis chamber where it is heated to 500°-1600° F. to remove the final traces of volatile hydrocarbons from the char. The devolatized char is processed through a rotary lock into a hollow flight screw conveyor where it is cooled to ambient levels of temperature. After cooling the pyrolyzed char, it is milled to a fine power, subsequently rolled into pellets and bagged as a carbon black product.

The devolatized hydrocarbons are withdrawn from the system and combined with other gas in the dust cyclone separator.

The partial devolatizing of the tire with radient energy accomplishes two major process tasks. The first is the reduction in microwave energy requirements when pyrolyzing char to roughly one-fifth of that required for pyrolyzing whole tires. The second is the elimination of a potential arcing problem that might occur with the steel wire contained in the whole tire when microwave energy is applied to them.

DESCRIPTION OF THE DRAWINGS

For a further understanding of the nature and objects of the present invention, reference is made to the following drawing in which like parts are given like reference numerals, and wherein.

DESCRIPTION OF THE PREFERRED EMBODIMENT

Figure 1A:
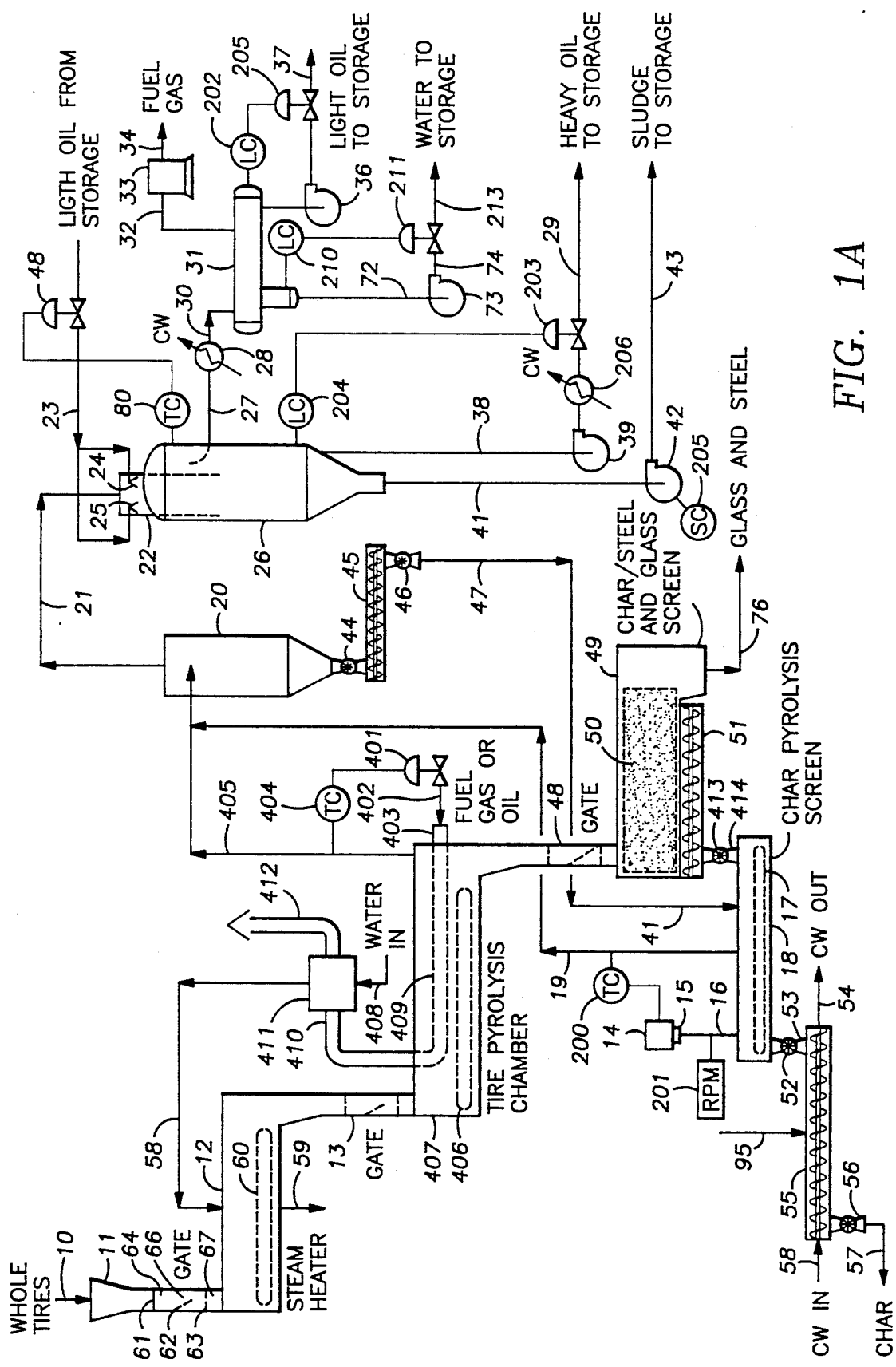
FIGS. 1A, 1B and 1C are a flow diagram of the preferred embodiment of the present invention.
Figure 1B:
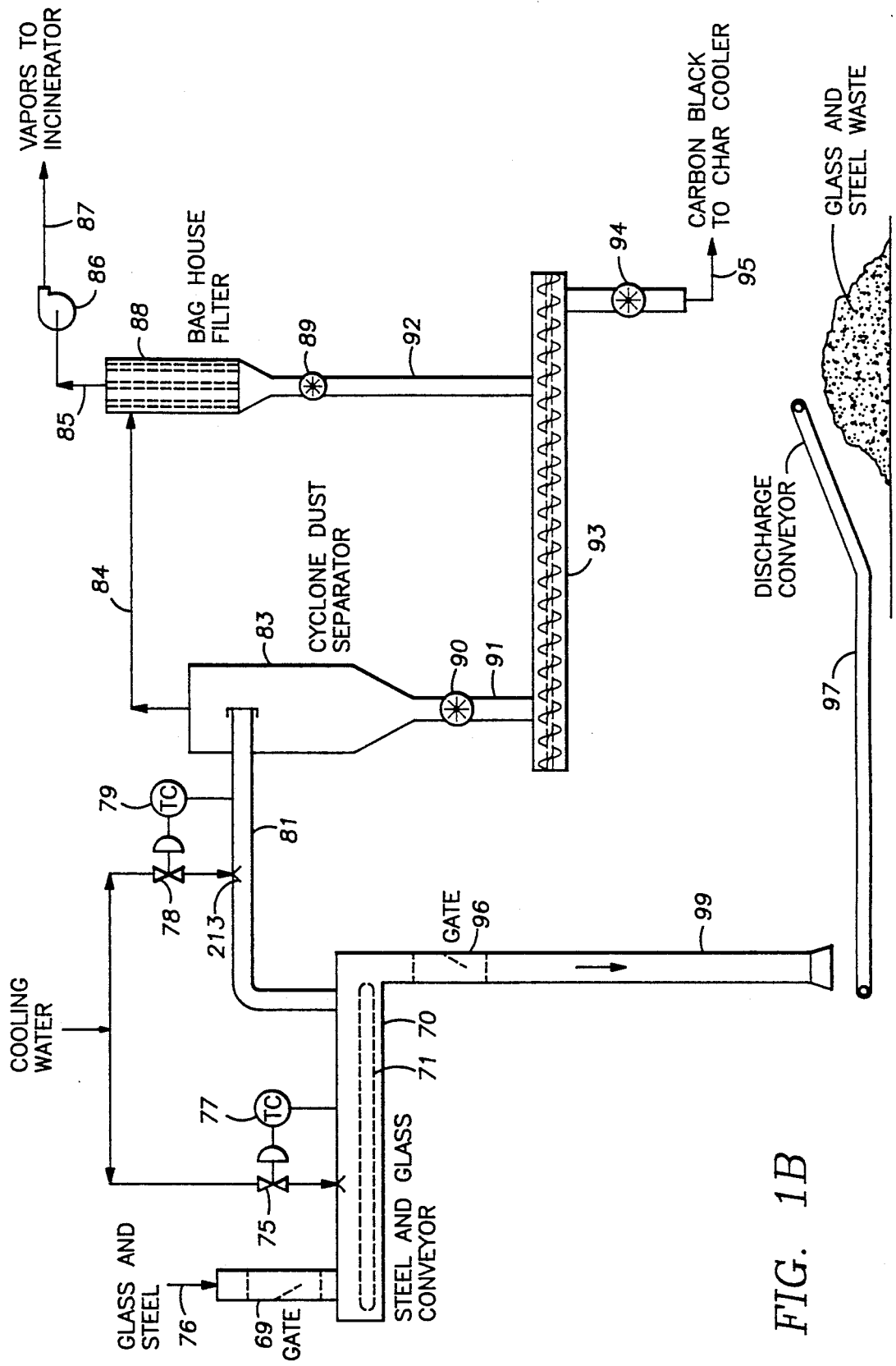
Figure 1C:
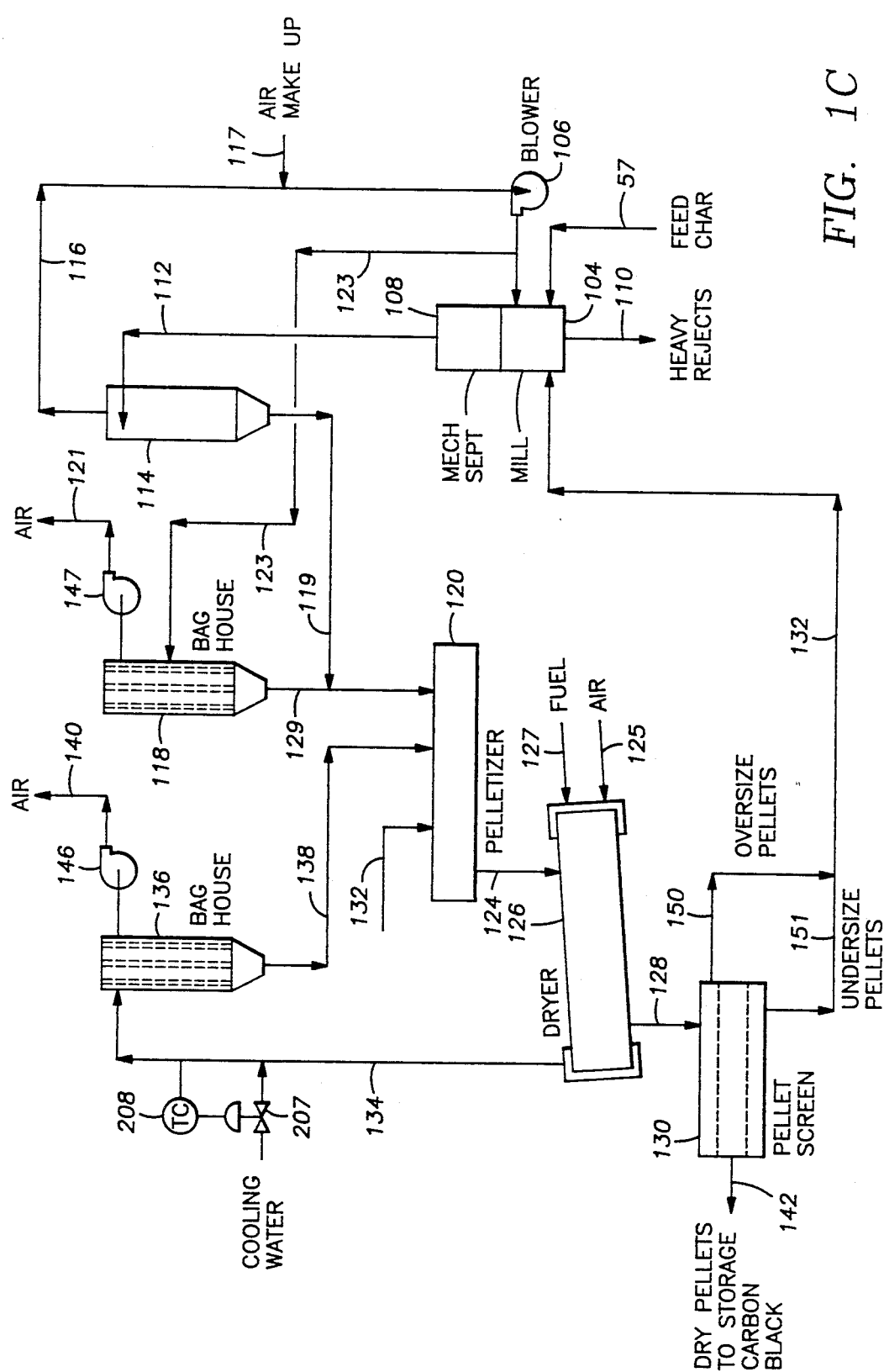

The process shown schematically in FIGS. 1A, 1B and 1C comprises:
1. Feed Preparation
2. Steam Preheat
3. Radient Tire Pyrolysis
4. Vapor Recovery
5. Solid Separation
6. Char Pyrolysis
7. Char Milling and Recovery
8. Pelletizing and Pellet Drying These sections are discussed in detail below.

1. Feed Preparation

As illustrated in FIG. 1A, whole tires (not shown), or pieces if preferred, entering at 10 are fed into the process through a chamber 64 of a three-stage gate 11. The tires are cleaned (not shown) prior to entry into chamber 64. Two gates 61, 63 of the three gates 61, 62, 63 operate simultaneously, opening and closing together. The third gate 62 is closed when gates 61, 63 are opened and open when gates 61, 63 are closed. This permits a tire to enter gate chamber 64 with gates 61, 63 closed. Thereafter gates 61, 63 open while gate 62 is closed to permit the tire to enter chamber 65. Chamber 65 is defined by the space between gates 61, 62. Gate 62 then opens when gates 61, 63 are closed and permits the tire in chamber 65 to drop into chamber 66. Chamber 66 is defined by the space between gates 62, 63. Gates 61, 63 then open after gate 62 closes, thereby permitting another tire in chamber 64 to drop into chamber 65 and the tire in chamber 66 to drop into chamber 67 for the tire preheater 12 below chamber 67. The cycle of gates 61, 62, 63 opening and closing is then repeated. These gates, complete with controls, may be purchased from Fuller Gate Company.

2. Steam Preheat

Whole tires, or parts if desired, enter the tire preheater 12 through chamber 67 where they are brought into direct contact with super heated steam from stream 58. The entering steam is at temperatures of 500° to 600° F. and pressures of 5 to 20 psig. The tires are heated from ambient temperatures of a range from 80° to 120° F. to a level of 300° to 450° F. During the heating in the tire preheater 12, the whole tires are continuously conveyed from the entry of the tire chamber 12 to the exit on a flat bed steel conveyor 60. The hot tires exit tire preheater 12 via gate 13. Gate 13 is substantially of the same construction and operation as gate 11. In addition to acting as a preheater, the tire preheater 12 acts as a seal between the environment and the pyrolysis chamber 18, leaking steam or water to the atmosphere as opposed to the gas generated from the pyrolysis of the tires.

3. Radient Tire Pyrolysis

Preheated whole tires, or pieces if desired, enter the tire pyrolysis unit or chamber through gate 13. The pyrolysis chamber is preferable constructed of high temperature alloy steel or refractory lined steel. The units and operating components should be constructed of high temperature alloy steel or equivalent material because of the high temperatures. The tires are conveyed from the entrance of the steel pyrolysis chamber 407 to the exit on a flat bed stainless steel conveyor 406. The energy to heat the tires from 200° to 500° F. to a level of 800° to 1000° F. at −5 to 20 psig is achieved by multiple number of radient tubes 409 (one of these shown schematically and as illustration in FIG. 1A). Each of the radient tubes 409 are heated internally to a temperature level of 1600°–2000° F. Both radient and convection heat are transferred from the tubes 409 to the tires moving through the tire pyrolysis chamber 407 on the conveyor 406. The tires are heated to temperatures of 800° to 1000° F. The volatile hydrocarbons are partially decomposed as gas from the tire and exit in conduit 405 to the cyclone dust separator 20.

The temperature of these gases in conduit 405 is measured by the temperature sensor 404 and control the amount of fuel to the burner 403, using the fuel control valve 401.

The burned gases produced in the radient tube 409 exit at a temperature of 1000° to 1200° F. in conduit 410 and flows to the waste heat steam boiler 411 to produce steam for the steam preheater 12.

The char, steel and fiberglass exit the tire pyrolysis chamber through gate 48 to the char, steel and glass separation system 49.

4. Vapor Recovery

During pyrolysis, hydrocarbon vapors separate from the tires in the pyrolysis units 18,407 and exit through the conduits 19,405. These hot gases at 1000° to 1100° F. and pressures of −5 to 20 psig are fed to a cyclone dust separator 20. The cyclone dust separator 20 is designed to separate any solid particulates that may have been carried over with the pyrolyzed tire vapors. The cyclone dust separator 20 may be heated with electrical strip heaters (not shown) to maintain the gas temperature and prevent condensation of any liquids before the carbon dust is separated from the gas. Several cyclone dust separators may be used in series to further reduce the solid particulate matter in the gas if necessary. The cyclone dust separators should be constructed of stainless steel or equivalent material because of the high temperatures.

The hot gas exits from the cyclone dust separator 20 in conduit 21 to the direct contact spray condenser unit 22 which acts as both a partial condenser and a final carbon black dust scrubber. The lighter oil is condensed separately to permit more effective separation of water vapor from a lighter oil. Should there be any carry-over of carbon black dust from the cyclone dust separator 20, it will be removed in the heavy oil/gas separator 26 and allowed to settle to the bottom of the separator 26 where it will be removed as sludge. Light oil from storage is also introduced via conduit 23, at a pressure of 10 to 200 psig and a temperature of 80° to 120° F., to the direct contact spray condenser unit 22. The amount of oil introduced is controlled by a temperature controller 67, having a sensor in the roof of heavy oil/gas separator 26, and control valve 68. This temperature is set at 200° to 220° F. The oil is fed to the spray nozzles 24, 25, such as hollow cone nozzles. The number of spray nozzles are illustrative and no limitation as to type or number is intended thereby. The fine spray from the hollow cone spray nozzles 24, 25 both cool and partially condense the hot gases from conduit 21.

The condensed oil and uncondensed gas flow into the heavy oil/gas separator 26. The condensed heavy oil exits in conduit 38 to pump 39 where it is pumped to water cooler 206 via conduit 40. The heavy oil is cooled below 140° F. The heavy oil exits the water cooler 206 via conduit 29 to storage. Flow of the heavy oil to storage is controlled by the level control sensor 204 and level control valve 203.

Sludge, or heavy oils containing solid particulate, exit at the bottom of the heavy oil/gas separator 26 via conduit 41 to pump 42, and is pumped to storage via conduit 43. The amount of sludge removed is achieved by adjusting the speed of pump 42 which is a gear-type pump, driven by a direct current motor and controlled by speed controller 205. Laboratory analysis will establish the level of solids in the sludge and will be used to set the flow rate.

The uncondensed vapors exit the heavy oil/gas separator via conduit 27 to a water cooler condenser 28 and reduced to temperatures of 80° to 100° F. These partially condensed fluids are fed, via conduit 30, to the three-phase water/gas/liquid separator 31. The separated, uncondensed gases exit the gas/liquid separator 31 in conduit 32 and are fed to the compressor 33 to elevate the pressure to a level of 20 to 30 psig. These compressed gases are then fed to a fuel system (not shown) via conduit 34, and may be used in the drying process for dryer 126 discussed below.

The general chemical composition of the uncondensed fuel gas is shown below:

TABLE I

| Tire Pyrolysis Fuel Gas | Volume Percent |
| --- | --- |
| Carbon Monoxide | 7 to 12 |
| Carbon Dioxide | 4 to 8 |
| Parriffins | 20 to 35 |
| Olefins | 35 to 45 |
| Other Hydrocarbons | 10 to 15 |
| Water Vapor | 3 to 8 |
| Average Mol Weight | 36 to 42 |
| Heating Value, Btu/1000 ft$^3$ | 1800 to 1900 |
| Vol/Ton of Tires, SCF/Ton | 600 to 1000 |

The water separates from the oil and is further processed to remove the final traces of oil in an oily-water filter separator portion of separator 31. It is subsequently pumped to a water storage tank or sewer via conduit 72 and pump 73 to and through conduit 74.

The light oil is pumped to storage via conduit 35 and pump 36 to and through conduit 37. This light oil may be used as the oil for conduit 23. A level control sensor 202 and level control valve 205 controls the flow rate of the light oil from the three phase water/gas/liquid separator 31.

After the water has been removed from the light oil, the light and heavy oil will be recombined as a composite oil.

The physical properties of the composite oil recovered is provided in Table II below:

TABLE II

| Pyrolysis Oil From Tires | |
| --- | --- |
| Volume/Ton of Tire, Bbl/Ton | 2.5 to 3.1 |
| Average Molecular Weight | 190 to 230 |
| Heating Value (Btu/lb) | 17,000 to 19,000 |
| U.O.P. K-Factor | 10 to 11 |
| Total Sulfur, Wt % | 0.1 to 1.0 |
| Total Chlorides, Wt % | 0.0 to 0.01 |
| Specific Gravity @ 60° F. | 0.7 to 1.1 |
| Specific Gravity @ 150° F. | 0.8 to 1.0 |
| Viscosity, CS @ 60° F. | 8 to 15 |
| Viscosity, CS @ 160° F. | 1 to 5 |
| Reid Vapor Pressure | 1 to 3 |
| Pour Point, °F. | −20 to −10 |
| Ash Content, Wt % | 0.02 to 0.3 |
| ASTM Distilation Profile | |
| Volume Percent Distilled | ASTM Boiling Point |
| 5 | 110 to 140 |
| 50 | 550 to 600 |
| 95 | 850 to 1000 |

5. Solid Separation

Char from the cyclone dust separator 20 is processed through rotary valve 44 to a screw conveyor 45. The char exits screw conveyor 45 via rotary valve 46 and conduit 47 where it is fed to char pyrolysis chamber 18.

Steel, glass and char from the pyrolysis unit 407 are processed through gate 48 to the rotary screen system 49. Gate 48 is similar in construction to gates 11, 13.

A rotary screen 50 is mounted within the rotary screen system 49. Screen 50, with, for example, ½ to 1 inch holes, moves back and forth causing the char to separate from the glass and steel. Ultimately, the char falls into the screw conveyor 51. The rotary screen system is tilted at an angle, such as approximately five degrees, and the glass and steel eventually move from the entryway to the exit as a result of the rotary motion. The steel and glass exit in conduit 76.

FIG. 1B illustrates the flow of the steel and glass from conduit 76. The steel and glass are processed through gate 69 to a steel flatbed conveyor member 71 in conveyor chamber 70. Cooling water is sprayed in this chamber to reduce the temperature from 1100° F. to a level of 250° to 300° F. This is achieved using spray nozzles 98, such as hollow cone spray nozzles, to permit influx of water. The number of spray nozzles are illustrative, and no limitation is intended thereby. The fine spray from the hollow cone spray nozzles 98 cool the glass, steel and dust vapors. The dust vapors, having dust, char and vapor, exit chamber 70 in conduit 81 where additional cooling water is added to cool these vapors, to the extent necessary, below 150° F. The amount of water fed to the conveyor chamber 70 is controlled by a control valve 75 and temperature controller 77 having a sensor mounted in the chamber 70. The amount of water fed to the conduit 81 is controlled by the temperature control valve 78 having a sensor mounted in conduit 81.

The cooled char, dust and vapors in conduit 81 is fed to a cyclone dust separator 83 via conduit 81. The dust or carbon black char separates from the vapors in the cyclone dust separator 83 and fall to the bottom. The dust is discharged from the cyclone dust separator 83 via rotary valve 90 into conduit 91 and subsequently into a screw conveyor 93.

The vapors from the cyclone dust separator 83 exit via conduit 84 and are fed to the bag house filter 88. The bag house filter 88 contains filter elements that separate the dust from the vapors.

The dust-free vapors exit from the bag house filter 88 in conduit 85 and are fed to a blower 86. The discharge from the blower 86 exits in conduit 87 and is fed to an incinerator (not shown).

The char solids settle to the bottom of the bag house filter 88 and exit through a rotary valve 89 into conduit 92. The char from conduits 91, 92 are fed to the screw conveyor 93, and discharge through rotary valve 94 into conduit 95. This char is subsequently fed as the third char feed to the char cooler 55.

The cooled glass and steel are conveyed through the conveyor chamber 70 to the exit gate 96 via conduit 99 onto a discharge conveyor 97 as trash.

6. Char Pyrolysis

The char from the screw conveyor 51, as illustrated in FIG. 1A, is discharged through the rotary valve 413 and fed to char pyrolysis chamber 18.

The char is heated to a temperature level of 1500° to 1800° F. using microwave energy as it is conveyed through the char pyrolysis chamber 18. The char pyrolysis chamber 18 is a refractory lined steel chamber with a ceramic lined deck. A high temperature alloy chain 17, with ceramic paddles, drag the char over the duct from the entrance to the exit of the char pyrolysis chamber 18. Alternately, a flat-bed high temperature alloy steel conveyor may be used to transport the char from the entrance of the char pyrolysis chamber 18 to the exit.

The microwave energy is generated by a multiple number of microwave units (one of these is shown schematically and as an illustration in FIG. 1A). Each microwave unit includes a power supply 14, magnetron 15 and waveguide 16. Each microwave unit generates power levels of five to fifty kilowatts. The number and type of microwaves and microwave generators are illustrative and no limitations are intended thereby.

The mechanism of microwave heating of carbon black is that of ionic conduction. Free ions exist at the interface of the carbon black and the remaining volatile hydrocarbons. These ions are not neutral, but rather positive or negatively charged. As such they are attracted by electric fields and their movement in such fields constitutes a flow of current. Their velocity represents kinetic energy. The ions do not travel far before they collide with unionized molecules, giving up their kinetic energy in a randomized fashion. This generates heat instantaneously. The heat energy is penetrating and efficient and unincumbered by the insulating effect of tire rubber that indirect heating systems must overcome. The temperature of the pyrolysis chamber 18 will be controlled by measuring the hydrocarbon gas temperature that exists in conduit 19. This will be achieved by the temperature controlling sensor 200 which will transmit a signal to the microwave power generator 14 to increase or decrease the power to maintain the desired a temperature. If the temperature reaches an unacceptable limit, a signal (by an interlock not shown) will be sent to shut the microwave system off.

Not all of the microwave power generated by the magnetron is absorbed by the tires or the pyrolysis chamber 18. A large quantity is reflected back to the wave guide 16 and could subsequently be reflected back to the magnetron source 15. This would destroy the system. To prevent this, the wave guide 16 is equipped with a ferrite circulator (not shown), or other "one way" valve, which permits microwaves to go forward to the pyrolysis chamber 18 but isolates the magnetron 15 from reflected microwaves. An impedence matching device or tuning stub (not shown) is also contained in the waveguide 16 which redirects reflected microwaves. The tuning stub is controlled by measuring the reflected microwaves with a reflected microwave power meter 201 and adjusting the tuning stub as required.

Entrance and exits of the pyrolysis chamber 18 will be equipped with standard quarter wave reflective chokes (not shown) to prevent microwave leakage to the environment.

The microwave units and the rest of the reactor system may be purchased from Cober Electronics, Inc.

The char from the char pyrolysis chamber 18 is discharged through the rotory lock 52 and fed to the char cooler 55 via conduit 53 located near the entrance of cooler 55. The char cooler 55 is a hollow flight screw conveyor and cooling water in conduit 58 is processed through the hollow flights to indirectly cool the char and exits through conduit 54. The cooled char, cooled to approximately 100° to 120° F., exits the char cooler 55 through a rotary valve 56 into conduit 57.

7. Char Milling and Recovery

As illustrated in FIG. 1C, the inlet feed from conduit 57 to the char milling and recovery section includes an aggregation of very small particles of carbon black and carbonaceous material cemented together in a skeletal matrix of residues from the decomposition of the tire rubber. The carbon black is from the carbon black portion of the tire. The carbonaceous material in the skeletal martrix is formed in the destructive heat treatment of the rubber and heavy oils in the tires and acts as the binder for the individual carbon black particles in the skeletal matrix of the char.

The milling process of the present invention breaks down the char agglomerates into individual carbon black particles and much smaller agglomerates of carbon black particles, the agglomerates being, for example, less than forty microns in diameter. Because different grades are used in the tread and walls of the tire and because different tire producers use different quantities of different carbon blacks, the carbon black recovered by the present invention from the original tire composition is a mixture of commercial carbon blacks from many sources in varying proportions. Therefore, carbon black produced by the present invention is a mixture of commercial carbon blacks and new carbon black and has mixed carbon black properties.

The char inlet feed, from the char cooler 55, passes by conduit 57 to a mill 104 as shown in FIG. 1C. This mill can be a roller mill, ball mill or hammer mill, all of which are commercially available. The mill 104 is air swept with a stream of air from blower 106. The mill breaks down the large agglomerates into individual carbon particles and small agglomerates. These particles are then picked up by the flow of air via blower 106 through the mill 104 and carried to mechanical separator 108. Mechanical separator 108 functions centrifugally to remove larger particles from the air stream. A portion of the heavy rejects from the mechanical separator 108 and the mill 104, which comprise a stream of less than five percent of the total mill feed, leaves the process as trash through conduit 110. Output stream 110 essentially eliminates all residual fiberglass, unburned rubber, iron rust and heavy metallic ash. The remaining carbon black is conveyed by air stream 112 to cyclone separator 114. Eighty to ninety percent of the carbon black is separated here from the air stream and conveyed to pelletizer 120 via conduit 119. The remaining carbon black travels with the air stream back through air return 116 from separator 104 to the suction of blower 106 where it is compressed and recycled. Additionally, make-up air is also introduced to the section of the blower 106 through line 117.

The major part of the discharge of the blower 106 flows directly to mill 104 to sweep up dust particles as discussed above. A sidestream of air from blower 160 is also bled off to pass through conduit 123 and, under pressure, through bag filter 118 where the remaining carbon black is trapped and fed to pelletizer 120 via conduit 129. The air from bag filter 118 is vented to atmosphere through conduit 121 and a blower 147.

Of course, the finer the char is milled, the better carbon black properties can be obtained. The embodiments of the present invention use an air swept roller mill with mechanical separators. This does a far superior job of grinding the char to a finer size using much less energy than the prior art.

In the present invention, it has been determined that a roller mill used in combination with mechanical separators and a cyclone and dust bag separator yields a process that can reject larger and heavier particles of unburned rubber, residual ash and iron rust from the system without too much loss of valuable carbon black. This system will also reject a major portion of the residual fiberglass left in the char. An air swept roller mill, with mechanical separators, can produce 99.9% by weight carbon black product passing a 325 mesh screen (44 micron average particle diameter) and a reject stream of less than 5% of total mill feed that will essentially eliminate residual fiberglass, unburned rubber, iron rust and heavy metallic ash.

It should be noticed that the present invention may recover two products. Both the cyclone separator fines from conduit 119 and the bag dust collector fines from conduit 129 are recovered separately. These products can be mixed together as a common product as shown in FIG. 1C or kept separate as two grades of carbon black. Because the bag filter 118 fines in conduit 129 have been elutriated from the other fines, they will consequently be of smaller average particles size, have lower bulk density and high specific surface. This will give them different physical properties from the cyclone separator fines in conduit 119.

At this point in the process, the carbon black must be pelletized to form a denser, more dust free pellet. If two products are produced, two pellets of the sort discussed in the next section will be used. However, without limiting the generality, a single pellatizer 120 is shown for illustration using a mixed product.

8. Pelletizing and Pellet Drying

Carbon black passes from bag filter 118 and cyclone separator 114 via conduits 129, 119, respectively, to a feed stream to pelletizer 120. Such pelletizers are commercially available. Here the pellets are wetted with water, delivered from hot water conduit 122, to pelletizer 120. This water may, in part, be the water that was heated by indirect heat exchange with other process flows. By "process flows" it is meant the oil products stream 27 and pyrolyzed solid phase carbonaceous material streams 47, 53, 95 that were cooled with indirect heat exchange with cold water.

Most commercial carbon black is pelletized with water or with suitable binders. While users want denser and more dust free pellets, they still want to retain the dispersion properties of unpelletized carbon blacks.

The present invention uses hot water (140°-180° F. and preferably at 165°-170° F.) without a binder for pelletizing carbon black. Carbon black has tremendous surface area per unit weight, and this surface must be completely wetted before stable pellets can be produced. The embodiments of the present invention use 35-45 pounds of 170° Fahrenheit water per 55-65 pounds carbon black dust to produce a suitable feed for wet pelletizing equipment. This water must then be driven off by heat in pellet dryers before the dry pellet (less than 1% moisture) is bagged and shipped. Extreme care must be taken not to degrade the pellet back to fines on drying. For ready dispersion after drying, it is also necessary that a soft pellet be produced from the pelletizer. Excessive attrition must also be prevented in drying. In addition, the interstitial moisture must be uniformly and slowly removed to prevent disintegration from excessive early steam generation.

The present invention used commercially available pelletizing equipment.

The wet pellets from pelletizer 120 are conveyed to a commercially available indirect pellet dryer 126, such as a rotary drum, via stream 124. The indirect rotary dryer burns fuel from conduit 125 with air from conduit 127 outside the shell of the dryer 126 and transfers the heat through the walls to the drying solids (not shown) inside the shell which is rotating. Because of the very high surface area of carbon black pellets and the affinity of this surface for water, temperatures much higher than the atmospheric boiling point of water must be used to insure that the pellets have discharged moisture down to the minimum residual moisture of less than 1% by weight in the product pellets. The dry pellets exit the dryer 126 in conveyor 128 at about 300° F. and 0.45% moisture by weight.

The moisture laden flue gases from the indirect dryer 126 exits the dryer 126 in duct 134 and enters dust collector 136 at preferably about 147° F. with a dew point of 119° F. The flue gas is cooled by the injection of cooling water into the flue gas to maintain a temperature below 150°. A temperature controller 208 measures the flue gas temperature in conduit 134 and signals the temperature control valve 207 to open or close increasing or decreasing the water flow as required to maintain the required temperature. A further spread of wet and dry temperatures is possible by bypassing part of the heated air from stages of the dryers (not shown) and mixing with exit gases in flue 134 ahead of the dust collector 136. The dust filter is conventional as is rehandling of the collected dust. The collected dust travels through conveyor 138 to reenter the pelletizer 120. The filtered air is discharged through blower 146 and vent 140 to the atmosphere.

The pellets proceed from the dryer 126 along conveyor 128 to a double deck screen 130. This screen has a top screen that separates oversized pelletizer formations from properly sized pellets and fines. The second screen is sized such that it retains the properly sized carbon black pellets but passes the fines. Both the oversized pellets and the fines are recycled by recycle stream 132 into the mill 104.

Properly sized and dried carbon black pellets are conveyed out of the process by output stream 142, for bagging and bulk shipment.

9. Carbon Black Properties

Table 111 compares the chemical properties of the carbon black produced from this invention with a commercially available carbon black.

TABLE III

| | Comparative Chemical Properties | | |
|---|---|---|---|
| Property | Test Method | Recovered Black | Commercial Black SFR-762 |
| DBP Absorption CC/100 gm | ASTM-D2414 | 74 | 75 |
| Iodine Number | ASTM-D1510 | 52 | 30 |
| C-Tab-Number | Phillips | 55 | 35 |
| % Ash | | 13.5 | 0.5 |
| % Heating Loss | ASTM-D1618 | 0.39 | 0.42 |
| PH | ASTM-D1512 | 7. | 8.5 |
| % Sulfur | ASTM-D1619 | 2.2 | 0.5 |

Table IV compares the physical properties of the carbon black produced from this invention with a commercially available carbon black.

TABLE IV

| | Comparative Physical Properties | |
|---|---|---|
| | Recovered Black | Commercial Black SRF-762 |
| Basic Mixture | | |
| SBR.1592, gm | 100 | 100 |
| SRF-762, gm | | 50 |
| Recovered Black, gm | 50 | |
| Zinc Oxide, gm | 3.5 | 3.5 |
| Sulfur, gm | 2 | 2 |
| Cumate, gm | 0.1 | 0.1 |
| Results | | |
| Modulus of Elasticity, 100% | 420 | 380 |
| Modulus of Elasticity, 200% | 1120 | 1150 |
| Modulus of Elasticity, 300% | 1900 | 1989 |
| Tensile | 2299 | 2293 |
| Hardness | 68 | 66 |
| Elongation | 330 | 360 |
| Min. Torque | 18.1 | 13.8 |
| Max. Torque | 113.1 | 103.5 |
| Scorth Time, Min. | 5 | 15 |
| Core Time, Min. | 6 | 21 |
| Tear | 235 | 163 |

The yield of carbon black from tires is 0.36 to 0.42 tons per ton of tires processed.

The yield of steel and glass is 0.5 to 0.8 tons per ton of tires processed.

The utilities requirements for the pyrolysis of tires using microwave energy is provided in Table V below:

TABLE V

| Tire Pyrolysis Utilities | |
|---|---|
| Microwave Electrical, KW/Ton | 1 to 2 |
| Other Electrical, KW/Ton | 0.1 to 0.3 |
| Superheated Steam, Mlbs/Ton | 2 to 2.5 |
| Cooling Water, GPM | 5 to 8 |

FIRST ALTERNATE EMBODIMENT

Figure 1D:
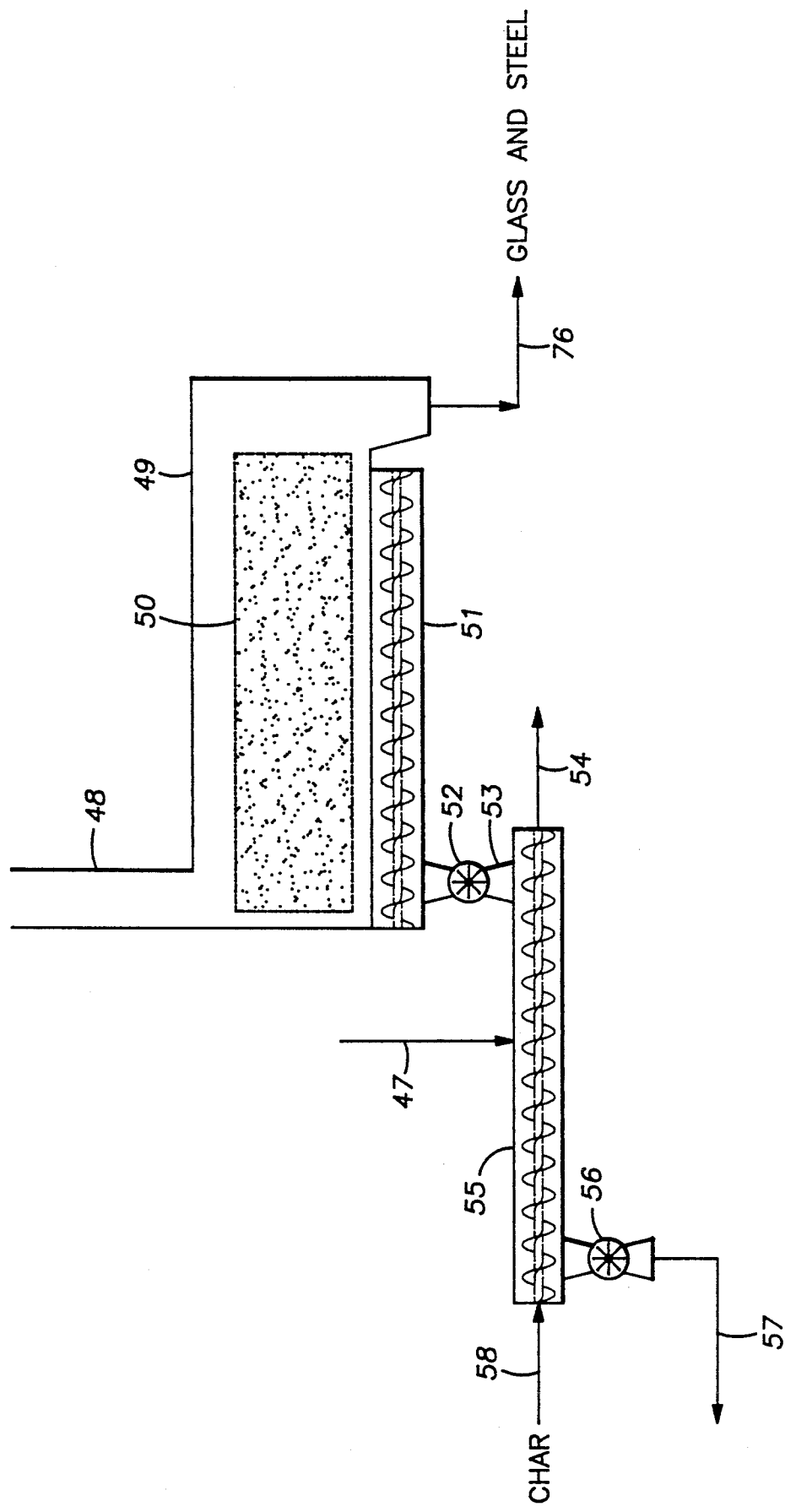
FIGS. 1D, 1E and 1F are alternate flow diagrams of a portion of the present invention of FIG. 1A.

Referring to FIGS. 1A and 1D, in this alternate embodiment involving char production, the char from the cyclone separator 240 (FIG. 1A) is processed through the rotary valve 44 (FIG. 1A) to the char cooler 55 (FIG. 1D) via conduit 47 (FIGS. 1A and 1D). The char from the rotary screen system 49 (FIG. 1D) flows directly from the screw conveyor 51 (FIG. 1D) through the rotary valve 52 (FIG. 1D) to the char cooler 53 (FIG. 1D). The microwave pyrolysis of the char (FIG. 1A) is not required. FIG. 1D illustrates the flow of char from the rotary screen system 49 to the char cooler 55. The char cooler 55 (FIG. 1D) is a hollow flight screw conveyor, and cooling water in conduit 58 (FIG. 1D) is processed through the hollow flights to indirectly cool the char and exits through conduit 54 (FIG. 1D). The cool char at 100° to 120° F. exits the char cooler 55 (FIG. 1D) through a rotary valve 56 (FIG. 1D) into conduit 57 (FIGS. 1A, 1D), and the char is sent to storage, and carbon black is not produced.

SECOND ALTERNATE EMBODIMENT

Figure 1E:
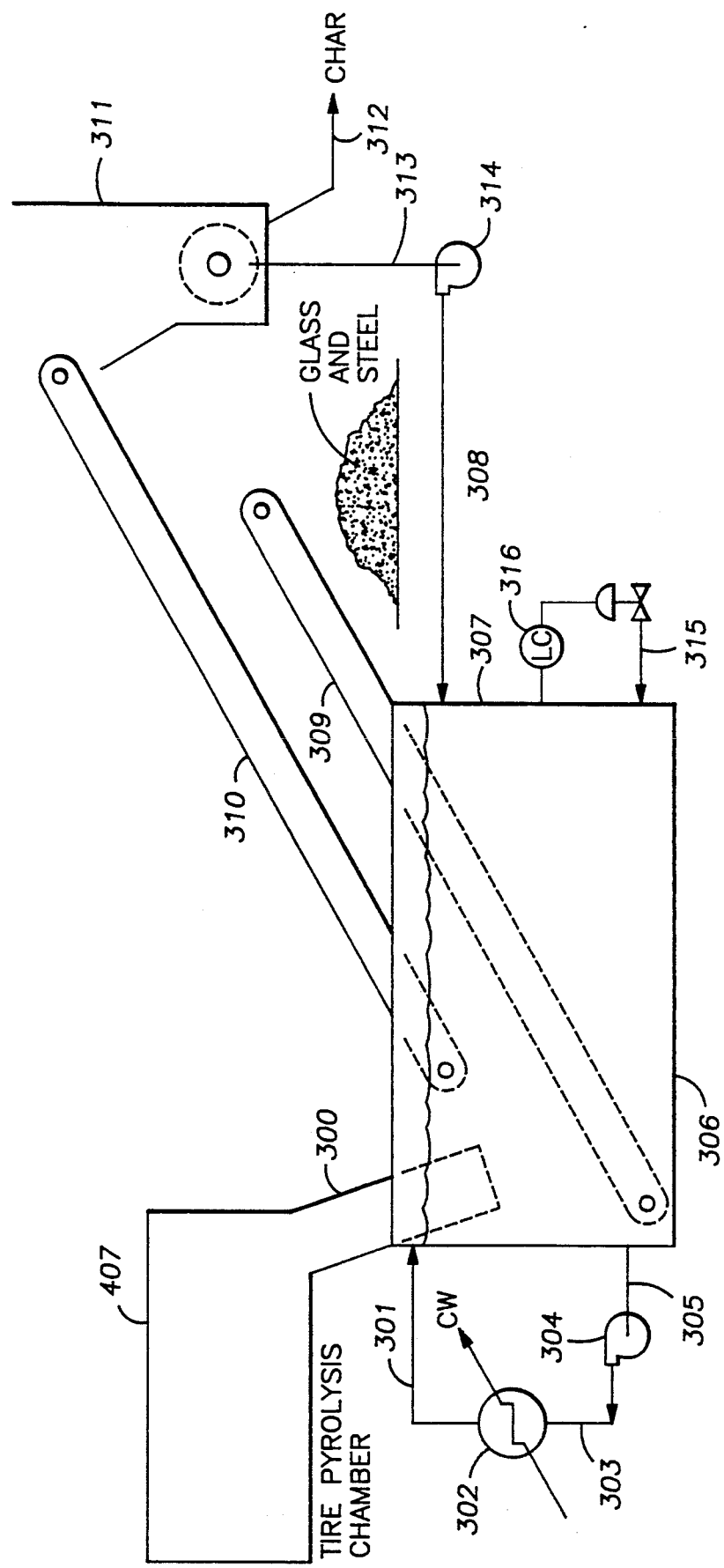

As shown in FIG. 1E, in this alternate, preferred embodiment involving solid separation and simultaneous cooling, the hot char, steel and fiberglass are fed directly from the tire pyrolysis chamber 407 (FIGS. 1A and 1E) to the water quench tank 306 (FIG. 1E). The char floats to the waters surface, and the steel and fiberglass sink to the bottom, providing an excellent separation while cooling the products simultaneously. The separation is superior to the mechanical system of the first alternate embodiment because dirt and any uncooked rubber also sink to the bottom of the quench tank 306 (Fig 1E). This produces a char which is purer in carbon and can be refined to produce an improved carbon black. The system also provides water seal between the tire pyrolysis system 407 (FIGS. 1A, 1E) and the environment which prevents any hydrocarbon leakage.

The hot char, steel and fiberglass from the tire pyrolysis chamber 407 (FIGS. 1A, 1E) flow through the duct 300 (Fig 1E) into the water quench tank 307 (Fig 1E). An eighteen to twenty inch water seal is provided in the duct 300 (FIG. 1E). The char floats to the top of the water 306 (FIG. 1E) and is picked up on conveyor 310 (FIG. 1E) and is delivered to a char/water screen filter 311 (FIG. 1E) where the water is separated from the char. The water is drained through the char/water screen filter 311 (FIG. 1E) via conduit 313 (FIG. 1E) to the water recycle pump 314 (FIG. 1E) and pumped back to the water quench tank 307 (FIG. 1E) via conduit 308 (FIG. 1E).

The char is discharged from the char/water screen filter 311 (FIG. 1E) to storage via conduit 312 (FIG. 1E).

The steel and fiberglass which sink to the bottom of the water quench tank 307 (FIG. 1E) are picked up by the steel fiberglass conveyor 309 (FIG. 1E) and conveyed to storage.

Water is continuously removed from the quench tank 307 (FIG. 1E) and cooled. This is achieved by pumping water from the water quench tank 307 (FIG. 1E) through the quench water cooler 302 (FIG. 1E). The water flows into the quench water cooler pump 304 (Fig 1E) in conduit 305 (FIG. 1E) and discharges into the conduit 303 (FIG. 1E). The quench water subsequently flows through the quench water cooler 302 (FIG. 1E) into the conduit 301 (FIG. 1E) and returns to the quench water tank 307 (FIG. 1E).

Make up water is added to offset the water which is evaporated via conduit 315 (FIG. 1E) which is controlled by the level controller 316 (FIG. 1E).

THIRD ALTERNATE EMBODIMENT

Figure 1F:
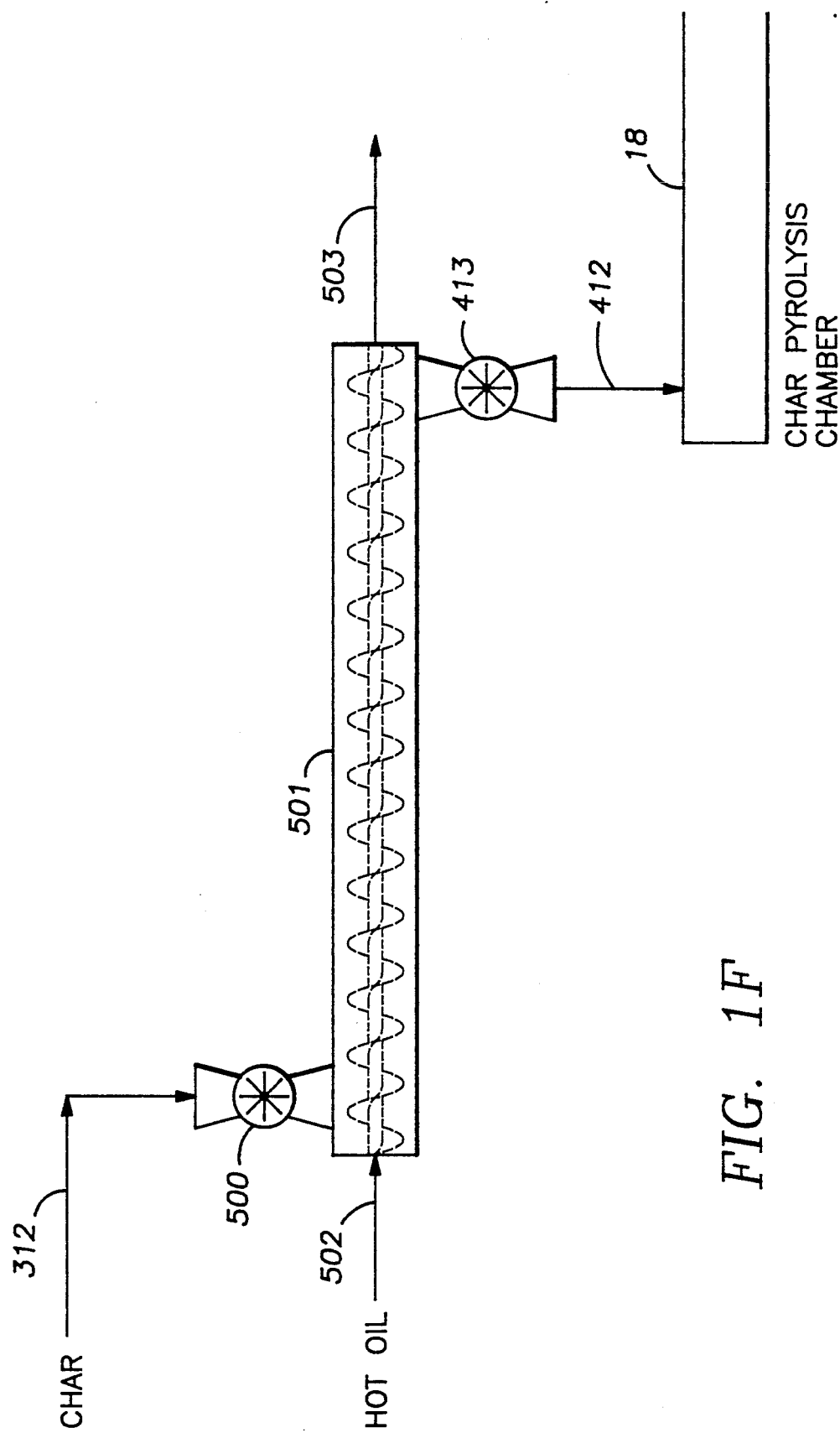

As shown in FIGS. 1A, 1E and 1F in this alternate embodiment, involving the microwave pyrolysis of char combined with the solid separation and simultaneous cooling of the char, steel and fiberglass, the char separated from the steel and fiberglass in the quench tank 307 (FIG. 1E) is reheated with hot oil (FIG. 1F) to a temperature of 550° to 650° F. FIGS. 1E and 1F illustrate the flow of char through the hot oil char heater 501 (FIG. 1F). The cold char in conduit 312 (FIGS. 1E, 1F) from the char/water screen filter 311 (Fig 1E) flows through a rotary valve 500 (FIG. 1F) into the hot oil char heater 501 (FIG. 1F). The hot oil char heater 501 (FIG. 1F) is a hollow flight screw conveyor. Hot oil in conduit 502 (Fig 1F) is processed through the hollow flights to indirectly heat the char and exits in conduit 503 (FIG. 1F). The hot oil is returned to a hot oil heating system (not shown) and reheated via conduit 503 (FIG. IF). The char which is heated to 550° to 650° F. is discharged through the rotary valve 413 (FIG. 1F) and conduit 412 (FIG. 1F) and flows to the char pyrolysis chamber 18 (FIGS. 1A and 1F).

It should also be noted that it is not a departure from the invention for the tires not to be whole, but to be substantially whole, such as in pieces of fourths of a tire.

Because many varying and different embodiments may be made within the scope of the inventive concept herein taught including equivalent structures or materials hereinafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. Apparatus for pyrolyzing discarded substantially whole tires, comprising;
   a first reactor vessel having an inlet and outlet for receiving the tires and producing an organic and inorganic material mix and a first amount of char and glass and steel therefrom, said first reactor vessel having a radiant heat source;
   first means for conveying the tires from the inlet to the outlet of the first reactor vessel;
   second means outside of the first reactor vessel for separating a substantial amount of dust having a second amount of char entrained in the organic and inorganic material mix from the organic material; and
   third means outside of the first reactor vessel for substantially separating the first amount of char from glass and steel in the first amount of char and glass and steel, and a second reactor vessel having receiving means for receiving the first amount of char from the third means; and
   a microwave transmitter having microwave means for supplying microwave energy to the first amount of char in the second reactor vessel.

2. The apparatus of claim 1, including seals on the first reactor vessel and an air lock connected to the inlet and outlet and an inert gas means for supplying inert gas in communication with the seals on the first reactor vessel for limiting air entrance into the first reactor vessel.

3. The apparatus of claim 1 including;

an indirect steam preheater connected to the inlet of the first reactor vessel.

4. The apparatus of claim 1, wherein there is further included fourth means for separating a third amount of char from the glass and steel effluent from the third means.

5. The apparatus of claim 4, wherein there is further included fifth means for combining and for substantially, simultaneously cooling the first, second and third amounts of char.

* * * * *